UNITED STATES PATENT OFFICE.

EDWARD GOODRICH ACHESON, OF BUFFALO, NEW YORK.

METHOD OF MANUFACTURING GRAPHITE ARTICLES.

SPECIFICATION forming part of Letters Patent No. 617,979, dated January 17, 1899.

Application filed November 3, 1898. Serial No. 695,405. (No specimens.)

*To all whom it may concern:*

Be it known that I, EDWARD GOODRICH ACHESON, a citizen of the United States, residing at Buffalo, in the county of Erie and State of New York, have invented certain new and useful Improvements in the Method of Manufacturing Graphite Articles, of which the following is a specification.

My invention relates to new and useful improvements in the art of manufacturing graphite articles or in producing articles containing a greater or less percentage of graphite, and it has for its object the improvement and simplification of the production of such articles; and it consists in the various features of invention substantially as hereinafter more particularly pointed out. Heretofore in general practice when it was desired to make an article consisting essentially or materially of graphite—such, for instance, as motor brushes, carpenter or lumbermen's pencils and crayons, crucibles, stove-polish, and other articles—it has been the custom to first prepare the graphite and the desired binding material and then mold or otherwise form the articles from such materials into the desired shape.

By my present invention I provide an improved method of manufacturing various articles containing the desired percentage of graphite—such, for instance, as brushes for electric motors or generators, lead-pencils, crayons, stove-polish, crucibles, and other articles.

Broadly stated, by my invention I first take the various raw materials in the desired proportions necessary to produce the intended result, and then mold under pressure or otherwise form the mixture into the shape of the article to be made therefrom, and then convert a greater or less portion of the materials into graphite, while the materials retain their molded or formed condition. Thus, for instance, amorphous carbon, in the form of coke, charcoal, lampblack, or any other form in which it exists in nature or has been produced, is granulated or powdered to any desired degree of fineness and is mixed with some material, as an elemental substance capable of combining with carbon or an oxid or salt capable of being reduced by carbon and the base of which will combine with carbon, and to which is added an appropriate binding material, and then mold or form the mixture into the shape or configuration of the article to be produced. This article is then subjected to a temperature sufficiently high and for a sufficient time and under such conditions as to cause more or less of the carbon in the article to be converted into graphite. Then the amorphous carbon in a pulverulent, granulated, or powdered form, for instance, is mixed with a metallic salt, as sulfate of iron, or an oxid of an element, as peroxid of iron, dioxid of silicon, or one of the elements in a state of fine subdivision, as iron filings. These materials may be mixed with the amorphous carbon, either dry or in the form of a solution of the salts or oxids, and when they are mixed thoroughly they are moistened with water, which may have a little sugar, molasses, tar, pitch, or any other suitable binding material in solution, so as to form a paste or mixture that can be readily molded or pressed or otherwise formed into the desired shape of the article to be produced. This shape or article is then placed in an electric furnace and subjected to a temperature and for sufficient time to cause portions of the amorphous carbon contained therein to be converted into graphite. A greater or less percentage of the amorphous carbon can thus be converted into graphite, according to the purposes desired, and in some instances I have found it advisable to leave a portion of the amorphous carbon unconverted, as it tends to render the article stronger.

While any desired form of electrical furnace suitable for the purpose may be used and the requisite temperature may be produced in any desired way, I have found the following a most successful method of treating the articles.

The articles to be treated are embedded in fine carbon, the bed containing the articles and the surrounding carbon preferably being made into a substantially cylindrical or oblong form, and this is preferably surrounded by a layer of granular amorphous carborundum, which is sufficiently thick to prevent the rapid radiation of heat. The bed of carbon and its contained articles embedded therein are arranged in the furnace so that a current of electricity of sufficient value to raise the temperature to the point necessary for the production of the graphite may be passed through it. In this way I produce articles containing a greater or less proportion of graphite by first mixing the materials and molding the articles out of the mixture of amorphous carbon and metallic salt or equivalent material and then converting portions of said carbon into graphite, while the article retains its desired shape.

While I have stated that a metallic salt or an oxid of an element or elements may be mixed with the amorphous carbon, I do not limit myself to what may be technically known under these names, but include therein all materials or substances which are reduced by and are capable of entering into chemical association with the carbon at the temperatures to which they are exposed, which associations, if actually made, are afterward broken or disassociated, leaving the carbon in the form of graphite. The amount of metallic salt used in connection with the amorphous carbon will vary, depending upon the particular character of the salt, the desired amount of graphitization, its mode of treatment and other conditions, and the given or specific instances, as in the manufacture of motor-brushes I take about ninety-seven parts of amorphous carbon, in the form of coke or charcoal reduced to a powder, and mix therewith about three parts of oxid of iron and form or mold the article out of this mixture. The value of the current necessary depends upon a number of conditions, as the character of the materials, the nature of the articles, &c.; and, as an example, if, for instances, the electrodes of the electric furnace are sixteen feet apart and the connecting cylinder of carbon containing the articles to be graphitized is twenty inches in diameter, the current at starting is about one hundred and fifty volts and three hundred amperes, and as the graphite is formed in the article it becomes a better conductor, reducing the resistance, so that the voltage of the current can be reduced and the amperage increased until the graphitization is completed to the desired extent, and at the end of the furnace operation the volts may be about one hundred and the amperes seven thousand.

In carrying out the process above described, while I have not been able to determine with absolute certainty the exact chemical or other changes which occur in said furnace, there is reason to believe, and I am at present of the opinion, that all volatile matters are driven off as the temperature rises to the several points of volatilization, and the salts or oxids are decomposed or reduced and their volatile constituents dissipated either in a free state or in association with a portion of the carbon, leaving in the path of the current the carbon of the molded article in a free or pure state and the metal or metallic base of the salt or oxid.

Those portions of the free carbon that are in immediate contact or proximity with the base unite therewith to form a carbid, and as the temperature rises the carbid is decomposed, separating the carbon in a graphitic form, and the base thus separated unites with another portion of the free carbon to form further carbids and is again decomposed, so that the action may be said to be a progressive one, in that successive portions of the free carbon are successively converted into graphite by what seems to be a progressive formation and decomposition of a carbid.

It may be said that a true carbid is not formed and decomposed and that the free carbon is converted into graphite without actually forming a carbid; but whatever may be the exact action or reaction taking place the actual result of this treatment is that a large portion of the carbon of the article is actually changed into graphite. My reasons for this theory are based somewhat upon the fact that there is not enough of the base or oxid to combine at once with the free carbon to form sufficient carbid, which on being decomposed would produce the amount of graphite actually produced if these elements combined in their proportions and weights usually understood to be necessary to form carbids.

The graphite blocks or articles made as above stated may in some instances be broken or powdered for use, as in the case of blocks for use as stove-polish, &c.

What I claim is—

1. The method, substantially as hereinbefore set forth of producing articles containing a greater or less percentage of graphite, which consists in forming the articles from a mixture of carbon, and a metallic salt, having a base capable of being reduced by and combining with carbon and then subjecting them to a temperature sufficiently high and for a sufficient time to form and then decompose a carbid, and thereby convert the carbon into graphite.

2. The method, substantially as hereinbefore set forth, of producing articles containing a greater or less percentage of graphite, which consists in forming the articles from a mixture of carbon and a metallic salt, having a base capable of being reduced by and combining with carbon, the relative proportions of the carbon and salt, being less than that necessary to form a carbid of all the carbon desired to be converted into graphite, and then subjecting them to a temperature sufficiently high to progressively form and then decompose a carbid, and thereby progressively convert the carbon into graphite.

In testimony whereof I have signed my name to this specification in the presence of two subscribing witnesses.

EDWARD GOODRICH ACHESON.

Witnesses:
GEO. R. RAYNER,
A. D. KYSOR.